Figure 4:
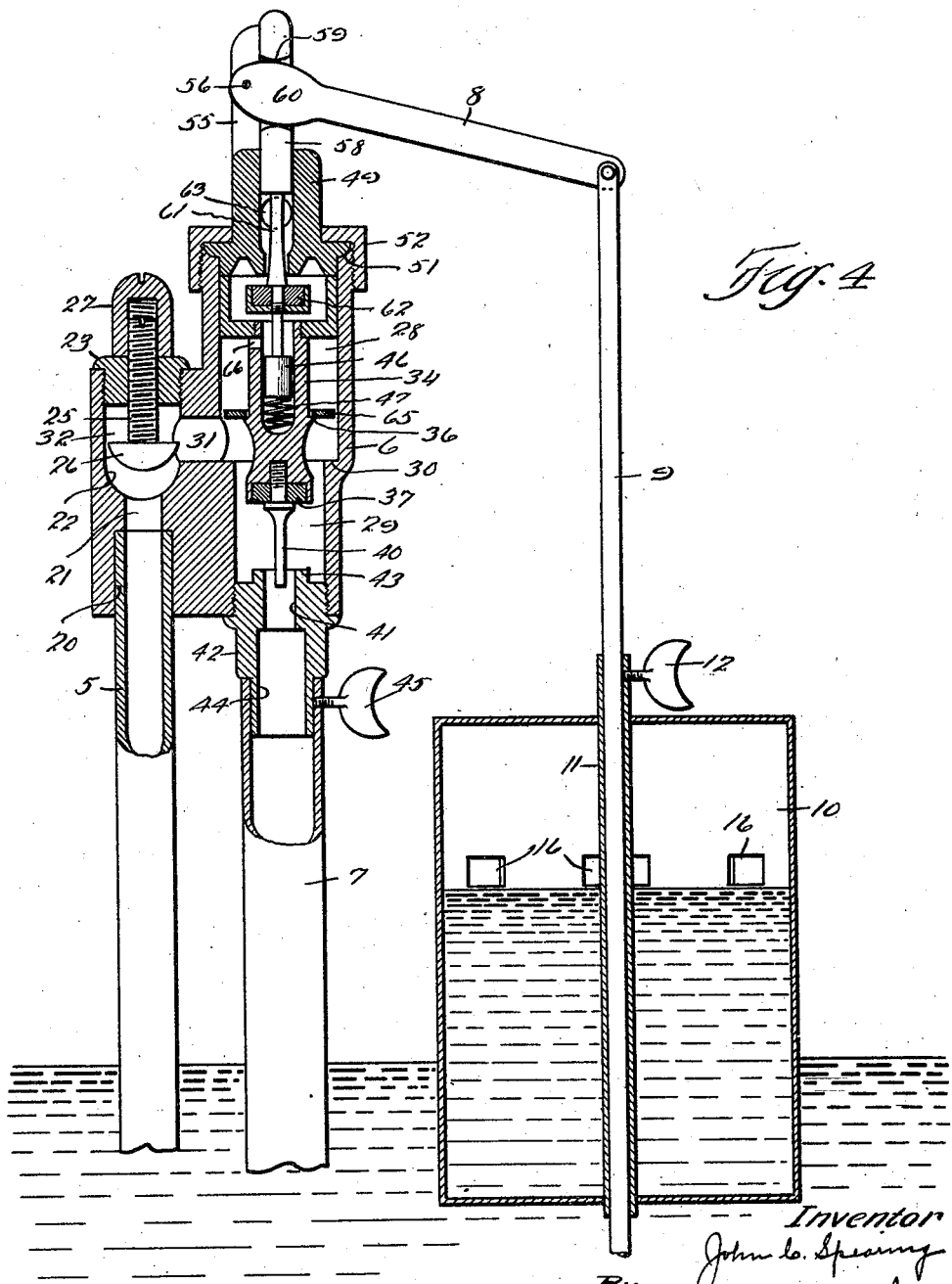

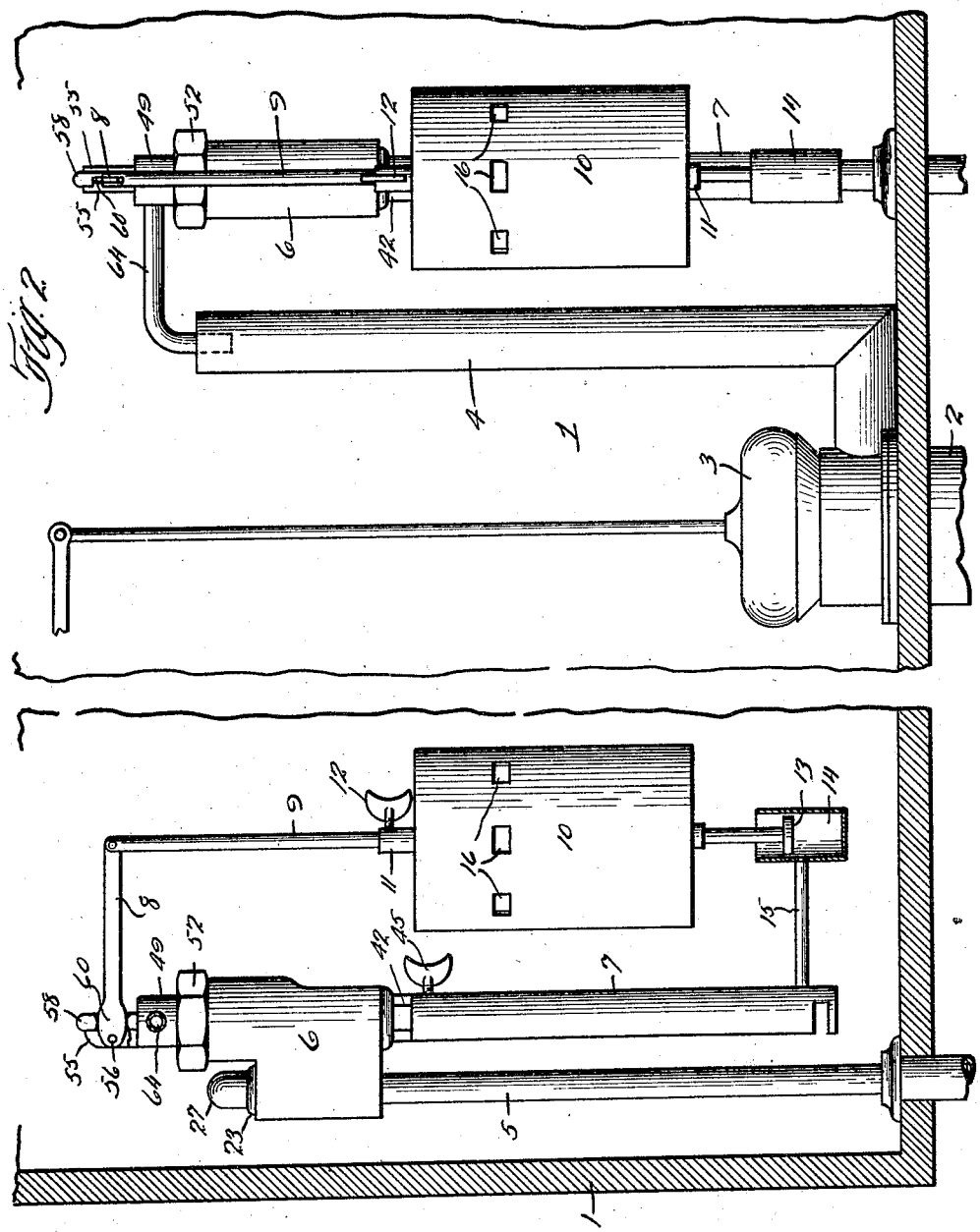

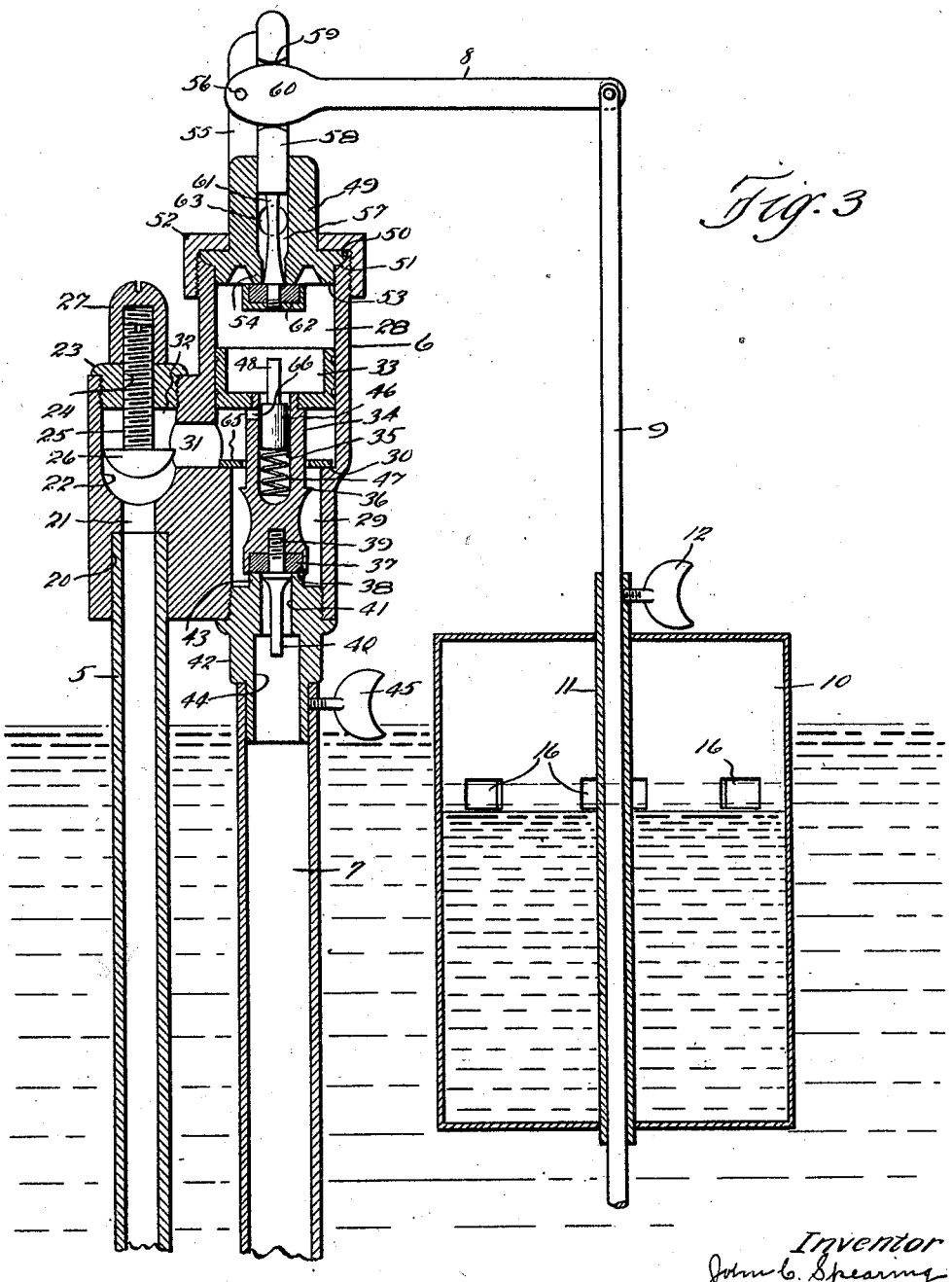

Patented Feb. 12, 1924.

1,483,392

UNITED STATES PATENT OFFICE.

JOHN C. SPEARING, OF CLEVELAND, OHIO.

AUTOMATIC PRESSURE VALVE FOR FLUSHING TANKS.

Application filed May 15, 1922. Serial No. 561,028.

*To all whom it may concern:*

Be it known that I, JOHN C. SPEARING, a subject of the Government of Canada, residing at Cleveland, in the county of Cuyahoga and State of Ohio, have invented certain new and useful Improvements in Automatic Pressure Valves for Flushing Tanks, of which the following is a specification.

This invention relates to refilling mechanisms for flush tanks such as are used with toilets. It has for its principal object to provide a valve which is simple of construction and which is positive in action, the pressure of the water holding the valve in either the open or closed position. Another object is to provide a device of this character which has a shut off valve connected therewith so that in case it is desired to work upon the tank or the valve the water can be shut off at the tank. Another object is to provide an improved float for operating said valve. Still another object is to provide means for adjusting the water level to which the tank will fill to any desired height. A still further object is to provide means for refilling the bowl after it has been flushed.

In the drawings Fig. 1 is a fragmentary sectional view of a flush tank showing my device in side elevation; Fig. 2 is a view similar to Fig. 1 taken at right angles thereto showing the flush pipe and ball valve, also the overflow and refill pipes; Fig. 3 is a sectional view through my device showing the valve in closed position and also the water level at this adjustment of the float; Fig. 4 is a view similar to Fig. 3 showing the valve in open position and the tank refilling.

In the drawings 1 indicates a flush tank, 2 the outlet thereof which connects to the bowl and 3 the flush ball valve. The overflow pipe is indicated at 4 and the water supply pipe at 5.

Mounted on the upper end of the water supply pipe 5 is a valve casing 6 which has the outlet pipe 7 to the tank connected thereto and extending down to near the bottom of the tank 1. The valve mechanism within the valve casing 6 to be hereinafter described is operated by the raising or lowering of a pivoted arm 8, said arm 8 being raised or lowered by a rod 9 which has a float 10 adjustably secured thereto. The rod 9 extends through a tube 11 within the float 10 and is adjustably connected thereto by a set screw 12. The lower end of the rod 9 has a piston 13 thereon which works in a dash pot 14 which is supported on one end of a rod 15, the other end of said rod 15 being connected to the pipe 7.

The float 10 is constructed of sheet metal having its upper and lower ends closed and having openings 16 cut through the sides towards the upper end thereof. When the tank is filled water will flow through said openings 16 into the float 10 and will remain therein up to this level irrespective of the level of the water in the tank. When the tank fills the water will rise around the float 10 and will trap the air in the float above the openings 16. When the water reaches a certain height the float will rise it becoming lighter than water due to the air trapped above the opening 16. This is clearly shown in Fig. 3. It will be seen by this construction I provide a weighted float which will always open the valve mechanism when the water falls below a certain level.

The valve mechanism will now be described: The upper end of the supply pipe 5 is inserted in an opening 20 in the valve casing 6. A reduced bore 21 communicates from the opening 20 to a hemispherical valve seat 22, and chamber 32. The chamber or bore 32 is closed by an externally threaded plug 23 having an internally threaded bore 24 which plug is screwed into the open end of the bore 32. A screw 25 having a hemispherical head 26 on the lower end thereof is inserted in the threaded bore 24 and a lock cap 27 will lock the screw 25 and consequently the head 26 in any desired position. It will be seen by this that the water entering the valve can be regulated or it can be entirely cut off if desired. The opposite side of the valve casing is bored out as indicated at 28 to a certain depth and from there on has a reduced bore 29 making a shoulder 30 between the bores 28 and 29. A passage 31 connects the bore 32 above the valve seat 22 with the bores 28 and 29. A piston 33, open at its upper end is adapted to work up and down in the bore 28 and has connected to the closed end thereof the downwardly projecting plug 34 which is bored as indicated at 35 and has an upwardly presented shoulder 36 midway thereof. A washer 37 is held in the recessed lower end 38 thereof by a screw 39 extending upwardly from a rectangular guide rod 40 which works in the bore 41 of a coupling 42 screwed into the lower end of the bore 29. On the upper face of said coupling 42 is a valve seat 43 against which the washer 37 is adapted to seat to shut off the water from entering the tank 1. The pipe 7 is connected to the reduced lower end 44 of the coupling 42 by a set screw 45.

A plunger 46 is mounted in the bore 35 in the plug 34 and said plunger 46 is of somewhat lesser diameter than the bore 35 so that it has a loose fit therein. A spring 47 normally holds the plunger 36 in the raised position shown in Fig. 3. On the upper end of the plunger 46 is a reduced extension 48.

A cap 49 has a rounded edge 50 which seats in a rounded seat 51 around the upper edge of the bore 28 said cap being held rigidly by a ring nut 52. The cap 49 has a flange 53 extending downwardly therefrom into the bore 28 and a boss 54 also extending downwardly within the flange 53. A pair of ears 55 extend upwardly from the cap 49 and the rod 8 is pivoted at 56 between said ears.

The cap 49 is also bored as at 57 said bore being somewhat reduced at its lower end within the boss 54. A rod 58 works within the bore 57 and this rod is notched as at 59 to engage around a widened portion 60 of the lever 8. A reduced portion 61 extends downwardly from the rod 58 and has a valve member 62 on the lower end thereof which is adapted to seat upwardly against the boss 54. A transverse bore 63 connects the bore 57 with one end of a refill pipe 64 and the other end of said refill pipe 64 is inserted in the upper end of the overflow pipe 4.

Water coming into the bore 57 when the valve 62 has been unseated by the float lowering the lever 8 will pass out the bore 63 through the refill pipe 64 and into the overflow pipe 4 and refill the bowl, after it has been flushed.

A washer 65 is placed around the plug 34, the diameter of the bore in the washer being somewhat greater than the diameter of the part 34, and said washer will rest upon the shoulder 36 when the valve is in open position shown in Fig. 4. It will also be noted that the washer 65 is of a somewhat lesser diameter than the bore 28.

The operation is as follows:

When the flush ball 3 is raised the water in the tank 1 is drained through the flush pipe 2 into the bowl. This will cause the float 10 to lower and in turn will lower the arm 8 which will move the valve 62 from its seat 54. This will allow the pressure of the water working against the piston 33 to raise the same as the pressure against the upper side of the piston 33 will be less than the pressure on the lower side, the water passing through a hole 66 in the plug 34 into the bore 35 and around the plunger 46 into the chamber above the piston 33. This then will raise the valve to the position shown in Fig. 4 and the water will flow through the passages 21, 32, 31 into the bores 28 and 29 and 41 into the pipe 7 and thence into the tank 1. As will be seen by Fig. 4, when the valve is in this position the extension 48 on the plunger 46 strikes the valve 62 and depresses the plunger 46 in the bore 35 against the pressure of the spring 47 to a point below the hole 66. This will allow a greater amount of water to pass through the refill pipe 64 into the bowl while the tank is filling.

When the water in the tank has reached the proper level the float 10 and rod 9 will operate the arm 8 and close the valve 62. This will then cause the pressure of the water to force the piston 33 downwardly and shut off the water into the pipe 7, closing the washer 37 against the valve seat 43. As the piston 33 is moved downwardly the washer 65 will rest upon the shoulder 30 and diminish the flow of water into the bore 29 and consequently into the pipe 7 and the valve will seat more readily and there will be no chattering. When the valve is in closed position the water passing through the hole 66 and into the bore 35 and around the plunger 46 into the chamber above the piston 33 will tend to force the piston 33 downwardly and hold the washer 37 firmly against the seat 43 and it will also exert an equal pressure upwardly and hold the valve 62 firmly against its seat 54.

The invention is not limited to the exact form shown but may be modified in various ways within the scope of the following claims.

I claim:

1. The combination with a flush tank and its supply and refill pipes, of a valve casing to which said pipes are connected, an outlet valve to the tank, at the bottom of the casing, said refill pipe being connected to the casing at the top thereof, and said supply pipe opening thru the side of the casing between the refill pipe and the outlet valve, a piston in the casing between the supply pipe connection and the refill pipe connection, said piston being connected to the outlet valve, and a float valve above the piston, controlling the outlet to the refill pipe.

2. The combination with a flush tank and its supply and refill pipes, of a valve casing having an outlet valve seat at its lower end, a float valve at its upper end controlling the refill pipe, the supply pipe being connected to the casing between said valves, and a piston in the casing between said supply pipe connection and the refill valve, said piston being provided with a plug projecting downwardly and cooperating with the outlet valve seat.

3. The combination with a flush tank and its supply and refill pipes, of a valve casing having an outlet valve seat at its lower end, a float valve at its upper end controlling the refill pipe, the supply pipe being connected to the casing between said valves, and a piston in the casing between said supply pipe connection and the refill valve, said piston being provided with a plug projecting downwardly and cooperating with the outlet valve seat, said piston having a by-passage from the lower to the upper side thereof, and a valve carried by the piston and controlling said by-passage and having a projection adapted to strike the refill valve to open the by-passage.

4. The combination with a flush tank and its supply and refill pipes, of a valve casing having an outlet valve seat at its lower end, a float valve at its upper end controlling the refill pipe, the supply pipe being connected to the casing between said valve, and a piston in the casing between said supply pipe connection and the refill valve, said piston being provided with a plug projecting downwardly and cooperating with the outlet valve seat, said piston and plug having a by-passage through the same, and a spring-pressed valve located in said by-passage and having an upwardly projecting stud adapted to strike the refill valve when the piston rises, to open said by-passage.

5. The combination with a flush tank and its supply and refill pipes, of a valve casing having a valve seat at its lower end, the refill pipe being connected to the upper end of the casing, and the supply pipe being connected to the intermediate portion of the casing, a float valve controlling the refill pipe and having a stem working through the top of the casing, a piston in the casing, between the supply pipe connection and said float valve, a plug depending from the piston and adapted to close against the outlet valve seat, and a washer carried by the plug adjacent the piston, and movable up and down thereon to restrict the flow through the outlet valve.

In testimony whereof, I affix my signature in presence of two witnesses.

JOHN C. SPEARING.

Witnesses:
EMMA SPEARING,
JOHN A. BOMMHARDT.